United States Patent [19]

McCrae et al.

[11] 4,143,058
[45] Mar. 6, 1979

[54] PROCESS FOR PRODUCTION OF AN AZOMETHINE PIGMENT

[75] Inventors: James M. McCrae, Stewarton; Alexander M. Irvine, Dean Park; Ian A. Macpherson, Paisley, all of United Kingdom; Vincent J. Cavalieri

[73] Assignee: Ciba-Geigy Corporation, Ardsley, N.Y.

[21] Appl. No.: 820,510

[22] Filed: Aug. 1, 1977

[30] Foreign Application Priority Data

Aug. 5, 1976 [GB] United Kingdom .............. 32617/76

[51] Int. Cl.$^2$ .............................................. C07F 1/08
[52] U.S. Cl. ............................ 260/438.1; 106/288 Q
[58] Field of Search ....................... 260/438.1, 429 C; 106/288 Q

[56] References Cited

U.S. PATENT DOCUMENTS

| | | | |
|---|---|---|---|
| 2,993,065 | 7/1961 | Kumins et al. | 260/439 |
| 3,677,782 | 7/1972 | Macpherson et al. | 106/288 Q |
| 3,700,709 | 10/1972 | Inman et al. | 260/438.1 |
| 3,864,371 | 2/1975 | Inman et al. | 260/429 C |

OTHER PUBLICATIONS

Houben-Weyl:7(1), pp. 36–37 (1945).
Organic-Synthesis 22, 63–64 (1942).
Wagner and Look Synthetic Organic Chemistry, John Wiley & Sons, Inc., N.Y., pp. 281–231 (1963).
Migrdichian Organic Synthesis, Reinhold Publ. Corp., N.Y. pp. 1336–1337, 1371 (1960).

Primary Examiner—Helen M. S. Sneed
Attorney, Agent, or Firm—Joseph F. DiPrima

[57] ABSTRACT

A process for the production of a compound of the formula:

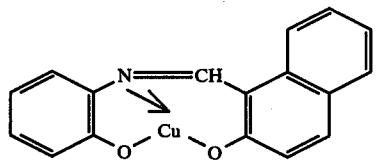

I in pigmentary form having a mean particle size not exceeding 0.3 microns, comprising:

(a) reacting β-naphthol with chloroform in an alkaline medium, using a sufficiently slow rate of addition of chloroform that the reaction mixture, after initially assuming a deep blue color and then turning green, maintains this green coloration until the addition of chloroform has been completed;

(b) reacting the alkali metal salt of 2-hydroxy-1-naphthaldehyde from step (a) with 2-aminophenol to produce a ligand of formula:

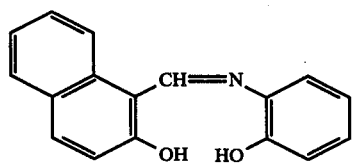

II (c) metallizing the ligand of formula II with an aqueous solution of a coppering agent, and isolating the complex metal pigment of formula I.

9 Claims, No Drawings

PROCESS FOR PRODUCTION OF AN AZOMETHINE PIGMENT

The present invention relates to a process for the production of an azomethino pigment.

In British Patent Specification No. 1,254,336, there is described a compound having the formula:

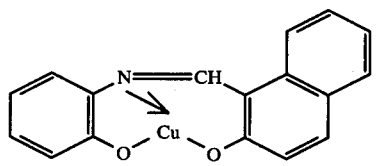

I in pigmentary form having a mean particle size not exceeding 2.0 microns. This specification also discloses processes for producing compound I, directly in pigmentary form, comprising either first reacting together 2-hydroxy-1-naphthaldehyde or the sodium salt thereof and 2-aminophenol under aqueous alkaline non-oxidising conditions, isolating and re-dispersing this ligand and adding thereto, whilst applying mechanical stirring to the mixture, an aqueous solution of a water-soluble coppering agent; alternatively, the metallisation step can be effected directly after formation of the ligand to which has been added an excess of ammonium sulphate.

We have now found that by producing the compound of formula I from the alkali metal salt of 2-hydroxy-1-naphthaldehyde prepared in a specific manner, the compound of formula I is unexpectedly superior, in particle size and technical performance, to other forms of the same compound produced by other previously known processes.

Accordingly, the present invention provides a process for the production of a compound of formula:

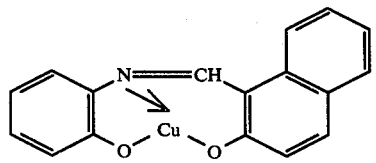

I in pigmentary form having a mean particle size not exceeding 0.3 microns, comprising:

(a) reacting β-naphthol with chloroform in an alkaline medium, using a sufficiently slow rate of addition of chloroform that the reaction mixture, after initially assuming a deep blue colour and then turning green, maintains this green colouration until the addition of chloroform has been completed;

(b) reacting the alkali metal salt of 2-hydroxy-1-naphthaldehyde from step (a) with 2-aminophenol to produce a ligand of formula:

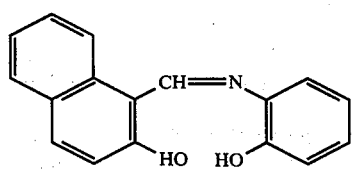

II (c) metallising the ligand of formula II with an aqueous solution of a coppering agent, and isolating the complex metal pigment of formula I.

In step (a), β-naphthol is preferably first added to an aqueous alcoholic alkaline medium, for instance a solution of an alkali metal hydroxide in a mixture of water and a C1–C4 aliphatic alcohol, especially methanol or ethanol, at an elevated temperature preferably at a temperature within the range of 70°–100° C. To the resulting pale brown emulsion, the chloroform reactant is then added slowly — preferably dropwise — at an elevated temperature, preferably 70°–100° C. After the addition of a few drops of chloroform, the reaction mixture assumes a blue colouration which is allowed to change to green before any further chloroform is added. Subsequently, chloroform is added slowly and at such a rate that the green colouration is maintained. After completion of the addition of chloroform, the alkali metal salt of 2-hydroxy-1-naphthaldehyde may be isolated e.g. by filtration, and washed, preferably with brine.

Step (b), is preferably effected by firstly re-slurrying a press-cake from step (a). The reaction is advantageously effected under aqueous, alkaline, non-oxidising conditions. Oxidation may be prevented by excluding air from the reactor by the use of an inert gas atmosphere, e.g. a nitrogen atmosphere, however oxidation is preferably prevented by the presence of a reducing agent such as sodium bisulphite, sodium dithionite, sodium sulphite or glucose in the reaction mixture. If a reducing agent is used, however, it is desirable to isolate the azomethine formed in step (b) and re-suspend it prior to coppering to avoid the reducing agent interfering with step (c).

Coppering in step (c) may be effected at any temperature from ambient to 100° C., preferably at a temperature within the range of from 80° to 100° C., using an aqueous solution of water-soluble coppering agent. Preferred coppering agents are copper acetate, cuprammonium sulphate and sodium cuprotartrate. In order to effect complete coppering, mechanical stirring is desirably exerted on the reaction mixture, for instance by vigorous agitation or by the use of a high-speed mixer. Addition of a dispersing agent may usefully be made to expedite the coppering reaction.

The pigment produced in accordance with the present invention gives shades of greenish yellow with excellent gloss and transparency. The pigment produced is suitable for use in the pigmentation of high molecular weight hydrophobic organic or other organic materials. The pigment still maintains its high solvent resistance, outstanding good fastness to overpainting and its resistance to weathering when incorporated into surface coatings but in addition it has greatly improved brightness, colour strength and gloss over the product described in BP 1254336. The pigment of this invention is suitable, for example, for use in the pigmentation of high molecular weight hydrophobic organic material, for instance of paints, lacquers, printing inks, rubber, synthetic polymeric materials, paper and textile materials. In general the pigment of the present invention exhibits good fastness properties especially to light, heat, cross-lacquering and migration, and resistance to organic solvents, such as trichloroethylene, toluene and methyl ethyl ketone.

The present invention also provides a composition comprising an organic material and a pigment of formula I produced according to the process of the invention as hereinbefore defined; as well as a method of colouring organic material comprising incorporating therein the pigmentary product of the process of the present invention.

The high molecular weight hydrophobic organic material or other organic material to be coloured may be any polymeric or other organic material capable of being pigmented or otherwise coloured. The material may be, for instance, a natural or synthetic polymer or copolymer, a coating composition for application to the surface of an article, or a printing liquid medium. However, preferred materials are natural or synthetic polymers or co-polymers, in the form of films or bulk material; more preferably paints, lacquers and other surface coating compositions, or tinting compositions for use in preparing such coating compositions and printing inks; especially stoving lacquers, desirably containing a metallic pigment. Examples of polymers or co-polymers which may be pigmented include vinyl chloride polymers and co-polymers; polyethylene, polyacrylonitrile, polypropylene and other polyolefines; polystyrene and polystyrene co-polymers especially polyacrylonitrile in the form of film fibre; and natural and synthetic rubbers.

The present invention is further illustrated by the following Examples. Parts and percentages shown therein are by weight.

EXAMPLE 1

(a) 144 parts of $\beta$-naphthol were added, with stirring, to 78.7 parts of methylated spirit and a solution of 280 parts of sodium hydroxide in 600 parts of cold water was added over a period of 8 minutes. The silver-white suspension so obtained was heated on a steam-bath to 80° C. over a period of 12 minutes and gave a pale brown emulsion which was maintained, whilst stirring, at 80°–85° C. for 30 minutes.

177.6 parts of chloroform were then added dropwise. The first few drops of chloroform gave a blue colouration which was allowed to change to green before any further chloroform was added. Addition of chloroform was then effected at a rate sufficient only to maintain the green colouration and to keep the reaction temperature at 80°–85° C. After about one fifth of the chloroform had been added, lustrous plates separated out from the reaction mixture, and the reaction suspension thickened as more chloroform was added. The resulting lustrous green suspension was maintained at 80°–85° C. for 15 minutes and gave a bronze suspension which was then allowed to cool to 20° C. The sodium salt of 2-hydroxy-1-naphthaldehyde was then filtered off and washed with brine.

(b) The press-cake from part (a) was re-slurried in 500 parts of water with stirring. 79.57 parts of o-aminophenol were added. A solution of 40 parts of sodium hydroxide in 200 parts of water was added. After stirring for five minutes, 200 parts of sodium bisulphite were added, causing the suspension to thicken considerably and change colour from red to yellow. 800 parts of water were added and gave a suspension thin enough to be stirred. After stirring for 16 hours, the suspension was heated to 90° C. over 20 minutes and maintained at 90° C. for 15 minutes. The azomethine was filtered off hot and washed with 3000 parts of water.

The filter-cake was dried and gave 732 parts of a paste containing 26.2% solids.

(c) 716.5 parts of the paste from part (b) were re-slurried in 750 parts of water using a Silverson stirrer fitted with a disintegrator head. 2 parts of a dispersing agent were added followed by 205.71 parts by hydrated copper sulphate dissolved in 1200 parts of water and 404 parts of ammonium hydroxide solution.

The resulting green suspension was heated to 95° C. over 35 minutes using steam injection. The temperature was maintained at 95° C. for one hour, the solid filtered off hot and washed with hot water until sulphate-free, and dried.

229 parts (71% theory on $\beta$-naphthol) of a green powder containing 19.1% Cu (Theory % Cu is 19.5) were obtained.

EXAMPLE 2

The dihydroxy azomethine copper II complex prepared in Example 1 was incorporated into a stoving lacquer.

A paste was formulated consisting of 1 part of the pigment and 3 parts of "Uresin B" (a commercial carbamate resin). The lacquer medium was prepared by mixing 50 parts of a 60% solution of "Beckosol 3246" (a coconut glycol alkyd resin of the non-drying type — "Beckosol" is a Trade Mark) in xylene with 30 parts of 2-methoxyethanol. The lacquer was then prepared in the conventional manner and a film of each sample was applied to cardboard. The stoving time was 30 minutes at 120° C.

The pigmentations made were: a 3% mixture comprising 0.3 parts of the pigment in 10 parts of the total mixture and a tint shade reduced 1:100 with titanium dioxide. The overlacquering fastness was measured by overlacquering the film on cardboard with white lacquer containing 20% titanium dioxide and restoving at 120° C. for 30 minutes. The resultant staining of the white film was then assessed. Heat stability was assessed after restoving samples of the lacquer films at 120° C. for 30 minutes and at 180° C. for 15 minutes. The lightfastness was assessed after exposure to a xenon arc lamp by comparison with the Blue Wool Scale (British Standard 1006 (1961)). The lightfastness, heat stability and overlacquering fastness were all found to be excellent.

EXAMPLE 3

60 parts of the product of Example 1 were ball milled with 138 parts of "Epok U9193" ("Epok" is a Trade Mark) which is a solution of an unmodified butylated melamine/formaldehyde resin in n-butanol and 452 parts of xylene. 350 parts of "Epok D2103" which is a solution of a hydroxy acrylic resin, a 1:1 mixture of xylene and n-butanol, were added gradually and ball milling continued. The resulting stainer mixture had a pigment to binder ratio of 1:5; this was adjusted to 1:10 by the addition of more of the same mixture of resins and the paint was thinned to the required viscosity for spraying. Suitable articles, for instance aluminium panels were sprayed and then stoved at 120° C. for 30 minutes. The resulting paint films had excellent fastness to light, heat and acids, for example, spotting the panels with 0.1N hydrochloric acid left no discolouration on drying, or stoving the panels at 180° C. for 30 minutes had practically no detectable effect on the colour. The resulting coated panels were a very attractive transparent yellow colour and could be oversprayed with, for example, a white paint of the same type without the yellow colour bleeding into and thus spoiling the new white finish.

When the stainer (with a 1:5 pigment to binder ratio) whose preparation is described above was combined with a suitable paste of finely powdered aluminium to give a pigment to aluminium ratio of 75:25 and the mixture was again thinned to a suitable viscosity for spraying, very attractive greenish yellow metallic coatings could be obtained which also had excellent fastness properties.

What is claimed is:

1. A process for the production of a complex metal compound of the formula

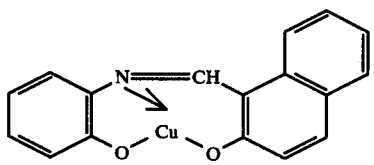

I in pigmentary form having a mean particle size not exceeding 0.3 microns, comprising (a) reacting β-naphthol with chloroform in an alkaline medium to form the 2-hydroxy-1-naphthaldehyde by adding β-naphthol to an aqueous alcoholic alkaline medium at a temperature within the range of from 70° to 100° C. to form a brown emulsion thereof; slowly adding chloroform to said brown emulsion at 70° to 100° C. until the reaction mixture assumes a blue coloration; halting the addition of chloroform until the blue coloration changes to green; and adding the remaining chloroform at a sufficiently slow rate that the green coloration is maintained;

(b) reacting the alkali metal salt of 2-hydroxy-10-naphthaldehyde from step (a) with 2-aminophenol to produce a ligand of the formula

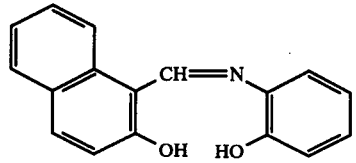

II (c) metallising the ligand of formula II with an aqueous solution of coppering agent, and isolating said complex metal compound.

2. A process as claimed in claim 1 wherein a presscake from step (a) is isolated and re-slurried for use in step (b).

3. A process as claimed in claim 2 wherein step (b) is effected under aqueous, alkaline non-oxidising conditions.

4. A process as claimed in claim 3 wherein oxidation is prevented by the presence of a reducing agent.

5. A process as claimed in claim 4 wherein the reducing agent is sodium bisulphite, sodium dithionite, sodium sulphite or glucose.

6. A process as claimed in claim 5 wherein the azomethine formed in step (b) is isolated and re-suspended prior to coppering in step (c).

7. A process as claimed in claim 1 wherein the coppering in step (c) is effected at a temperature within the range of from 80° to 100° C. using an aqueous solution of a water-soluble coppering agent.

8. A process as claimed in claim 7 wherein the coppering agent is copper acetate, cuprammonium sulphate or sodium cuprotartrate.

9. A process as claimed in claim 7 wherein mechanical stirring is exerted on the reaction mixture of step (c).

* * * * *